(12) United States Patent
Ritter

(10) Patent No.: US 7,021,004 B2
(45) Date of Patent: Apr. 4, 2006

(54) ACTUATING DEVICE

(75) Inventor: Andreas Ritter, Hilgert (DE)

(73) Assignee: Stabilus GmbH, Koblenz (DE)

( * ) Notice: Subject to any disclaimer, the term of this patent is extended or adjusted under 35 U.S.C. 154(b) by 166 days.

(21) Appl. No.: 10/673,931

(22) Filed: Sep. 29, 2003

(65) Prior Publication Data

US 2004/0159170 A1 Aug. 19, 2004

(30) Foreign Application Priority Data

Sep. 28, 2002 (DE) .............................. 102 45 458

(51) Int. Cl.
*E05F 11/24* (2006.01)
*E05F 11/48* (2006.01)

(52) U.S. Cl. ........................... 49/340; 49/352; 49/349; 296/146.4; 296/146.8

(58) Field of Classification Search .................. 49/339, 49/340, 346, 325, 352, 349, 341; 74/89.22, 74/89.2, 89.21; 296/146.4, 146.8, 106
See application file for complete search history.

(56) References Cited

U.S. PATENT DOCUMENTS

| 4,478,004 | A | * | 10/1984 | Andrei-Alexandru et al. 49/349 |
| 4,903,435 | A | | 2/1990 | Bittmann et al. |
| 5,448,856 | A | * | 9/1995 | Moore et al. ................. 49/340 |
| 5,563,483 | A | | 10/1996 | Kowall et al. |
| 5,588,258 | A | * | 12/1996 | Wright et al. ................. 49/340 |
| 5,896,703 | A | * | 4/1999 | Wright et al. ................. 49/339 |
| 6,068,327 | A | * | 5/2000 | Junginger ................. 296/146.8 |
| 6,293,050 | B1 | * | 9/2001 | Johnk .......................... 49/339 |
| 6,367,864 | B1 | | 4/2002 | Rogers, Jr. et al. |
| 6,398,288 | B1 | * | 6/2002 | Yuge ....................... 296/146.4 |
| 6,557,924 | B1 | * | 5/2003 | Lauderbach et al. ..... 296/146.4 |
| 6,600,285 | B1 | * | 7/2003 | Mintgen et al. ............. 318/468 |
| 6,601,903 | B1 | * | 8/2003 | Nakagome ................... 49/339 |
| 6,646,398 | B1 | * | 11/2003 | Fukazawa et al. ............ 49/352 |
| 6,767,048 | B1 | * | 7/2004 | Yokota .................... 296/146.4 |
| 6,799,790 | B1 | * | 10/2004 | Sakai et al. .............. 296/146.8 |
| 2001/0033091 | A1 | | 10/2001 | Rogers, Jr. et al. |
| 2001/0035725 | A1 | | 11/2001 | Mintgen et al. |
| 2002/0084675 | A1 | | 7/2002 | Buchaanan, Jr. et al. |

FOREIGN PATENT DOCUMENTS

| DE | 2 061 407 | 6/1972 |
| WO | WO 97/04204 | 2/1997 |

* cited by examiner

*Primary Examiner*—Hugh B. Thompson, II
(74) *Attorney, Agent, or Firm*—Cohen, Pontani, Lieberman & Pavane

(57) ABSTRACT

An actuating device includes a base part and a part which can be moved and is coupled to the base part in a manner such that it can pivot about a pivot axis. A driving device has a cable which can be wound up on a cable drum to drive the movement of the part which can be moved. The driving device has a pull/push rod which is coupled by its one end to the part which can be moved at a distance from the pivot axis and is guided movably by its second end along a guide path, which extends approximately at right angles to the pivot axis, on the base part. In this case, the second end of the pull/push rod can be pulled by a first cable to a first end of the guide path and by a second cable to a second end of the guide path.

23 Claims, 4 Drawing Sheets

ACTUATING DEVICE

BACKGROUND OF THE INVENTION

1. Field of the Invention

The invention is concerned with an actuating device having a base part and a part which can be moved and is coupled to the base part in a manner such that it can pivot about the pivot axis, and having a driving device which has a cable which can be wound up on a cable drum to drive the movement of the part which can be moved.

2. Description of the Related Art

An actuating device of this type is known in a motor vehicle, the part which can be moved being a flap which can be moved from an open position into a closed position counter to the force of a piston-cylinder assembly by means of a cable device which can be driven by electric motor. The movement of the flap in the opening direction takes place by the ejection force of the piston-cylinder assembly and is therefore not actively controlled.

SUMMARY OF THE INVENTION

The object of the invention is to provide an actuating device of the type mentioned at the beginning which, while having a simple construction, can be actively activated both in the opening and the closing direction.

This object is achieved according to the invention in that the driving device has a pull/push rod which is coupled by one end to the part which can be moved or to the base part at a distance from the pivot axis and is guided movably by its second end along a guide path, which extends approximately at right angles to the pivot axis, on the base part or the part which can be moved, it being possible for the second end of the pull/push rod to be pulled by a first cable to a first end of the guide path and by a second cable to a second end of the guide path.

This design enables the part which can be moved to be actively activated both in the closing direction and in the opening direction and to be driven with a uniform movement.

In this case, a respective cable drum can be assigned to the first and to the second cable, the cable drums being drivable in a manner such that the cables can be wound up and unwound in an opposed manner.

By virtue of the second end of the pull/push rod being arranged between the two cables, an advancing of this second end in the direction of the pulling cable in each case due to a kinematically induced driving of the part which can be moved is not possible. One cable pulls while the other cable brakes, since only the same amount of cable is unwound as is also wound up, with the result that the closing and opening movement takes place very uniformly.

If both cables are guided to a common cable drum and can be wound up and unwound in an opposed manner on the cable drum which can be driven by the reversible driving device, the required outlay on parts and construction space is reduced.

If the one cable is wound up by a certain amount, the other cable is at the same time unwound by the same amount and vice versa. This results in a particular uniformity of the opening and closing movements of the part which can be moved.

The one or both cable drums can be drivable in a rotatable manner by an electric motor drive.

If the cable drum or cable drums can be driven in a rotatable manner via gears, the drive or the drives can be realized with a smaller amount of force. For example, the use of a small pinion gear driven by a motor with a larger driven gear connected to the cable drum or drums permits the use of a small motor.

The drive or the drives can be arranged in different positions if the first and/or the second cable are guided to a cable drum via a deflection pulley.

If the first and/or the second cable are guided to a cable drum in the manner of a block and tackle about one or more deflection pulleys, the required cable forces are halved once or more than once.

The first and/or the second cable can be the core of a Bowden cable.

In principle, the guide path can extend in any manner, so that an adjusting movement of non-linear profile can be achieved in accordance with the profile of the guide path. However, the guide path may also have an approximately linear guide path.

The adjusting movement runs smoothly and the adjusting forces which are required are reduced if the second end of the pull/push rod is arranged on a guide slide which is guided displaceably in a slideway along the guide path.

In order to achieve control of the entire system of the actuating device, the relative position of the part which can be moved to the base part can be detected by a sensor.

In a simple embodiment, the sensor is a rotational position sensor which is preferably arranged coaxially with the pivot axis of the part which can be moved.

In this case, the pivoted position of the part which can be moved can be detected by the rotational position sensor.

Another, likewise advantageous possibility consists in that the positions of the electric motor drives can be detected by the rotational position sensor, it also being possible for the rotational position sensor to be integrated in one or in both electric motor drives.

As an alternative to a rotational position sensor, it is also possible for the sensor to be a linear position sensor which can be used to detect the position of the second end of the pull/push rod.

Any type of position sensor can be used as the sensor. A robust design consists in that the sensor is a potentiometer.

If the cable drum can be driven in a rotatable manner by the driving device via a clutch, in which case the clutch can be integrated in the drive, then, if the drive is not operated, the part which can be moved can also be moved manually.

The clutch is preferably an electromagnetic clutch.

In this case, the clutch is opened in the non-energized state and is closed in the energized state. If the drive is not energized or if the current fails, the cable drum is separated from a driving motor, if appropriate by means of a gear connected upstream.

A stopping and retaining of the part which can be moved is realized by the clutch being energized with the electric motor drive simultaneously deactivated.

If the driving device, in particular the electric motor drive, is self-locking, then when the drive is deactivated, the cable drum and, if appropriate, also the gear are blocked, so that neither of the two cables can be unwound. The second end of the pull/push rod and, if appropriate, the guide slide and, together with it, the part which can be moved are therefore also blocked in the current position.

If a force accumulator is arranged between the base part and the movable part, a substantial reduction of the actuating force for changing the position of the part which can be moved can be achieved on account of a weight counterbalance.

A fixing element can also be arranged between the base part and the movable part, by means of which, when the part which can be moved is unactuated, the part can be retained in its position by a retaining force, it being possible for the retaining force to preferably be eliminated by actuation of the part which can be moved.

The functions of the actuating device are maintained without significant restrictions if the part which can be moved is actuated manually. In a simple design, the force accumulator or the fixing element is designed as a piston-cylinder unit, the piston being connected to the movable part and the cylinder being connected to the base part, or the piston being connected to the base part and the cylinder being connected to the movable part.

The actuating device can be used in a particularly advantageous manner if the base part is a body part and the part which can be moved is a flap, such as, for example, a front bonnet, a tailgate or a side door of a motor vehicle.

Exemplary embodiments of the invention are illustrated in the drawing and will be described in greater detail below.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
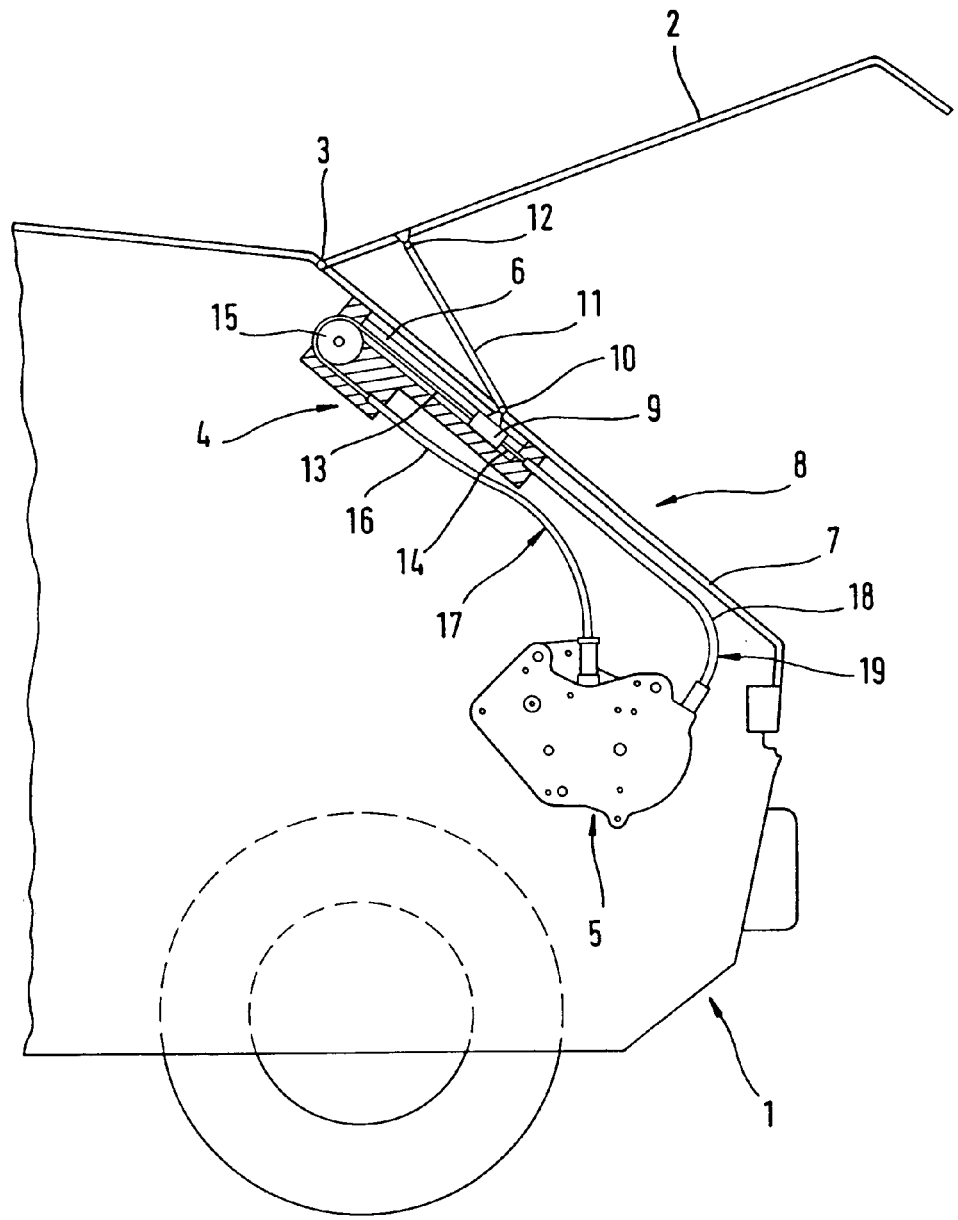
FIG. 1 shows a schematic cross section of an actuating device in the rear region of a motor vehicle in side view.
Figure 2:
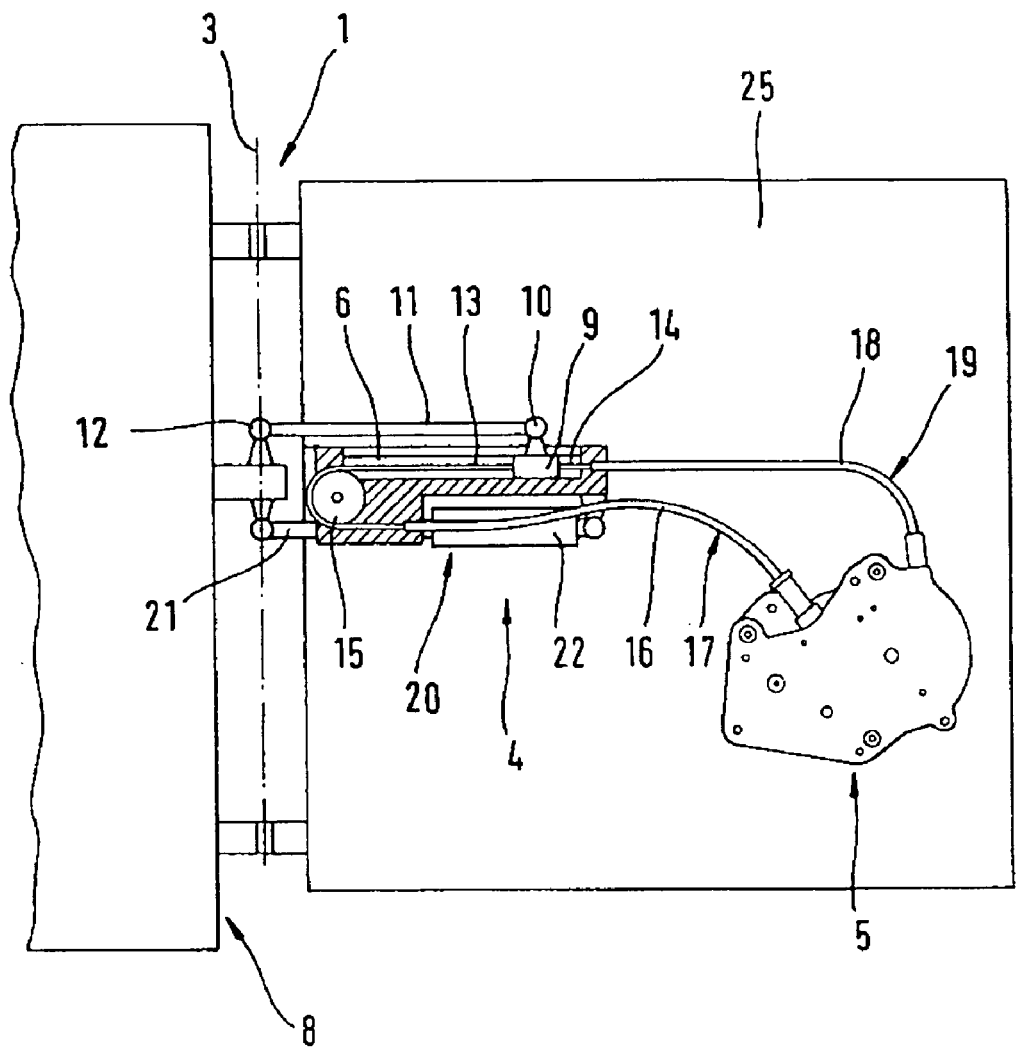
FIG. 2 shows a schematic cross section of an actuating device in the side door region of a motor vehicle in side view.

FIG. 1 illustrates the rear 1 and FIG. 2 the side of a motor vehicle, the opening 8 of which can be closed by a tailgate 2 or side door 25, respectively, which is coupled to the upper opening edge of the opening 8 in a manner such that it can pivot about a horizontal pivot axis 3.

A linear slideway unit 4 and a driving unit 5 are arranged on the side wall of the body in FIG. 1 and on the side door 25 in FIG. 2.

The linear slideway unit 4 has a slideway 6 which extends in FIG. 1 along the lateral opening edge 7 and the opening 8 which is to be closed.

A guide slide 9 is arranged displaceably in the slideway 6. The second end 10 of a pull/push rod 11 is coupled to the guide slide 9 while the first end 12 of the pull/push rod 11, which extends approximately at right angles to the pivot axis 3, is coupled to the tailgate 2 at a distance from the pivot axis 3.

A first cable 13 and a second cable 14 are fastened by their one end to the guide slide 9. The cables 13 and 14 extend away from the guide slide 9 in opposite directions along the slideway 6 as far as their respective ends.

The first cable 13 is guided about a deflection pulley 15 at the upper end of the slideway 6 and is deflected through 180° and furthermore forms the core of a Bowden cable 17 which is provided with a flexible sheath 16 and leads to the driving unit 5. In this case, the sheath 16 is supported axially by its ends on the linear slideway unit 4 and on the driving unit 5.

The second cable 14, as the core of a Bowden cable 19 which is provided with a flexible sheath 18, leads to the driving unit 5, the ends of the sheath 18 likewise being supported axially on the linear slideway unit 4 and on the driving unit 5. Those ends of the cables 13 and 14 which are guided to the driving unit 5 can be wound up and unwound in an opposed manner on a common cable drum which can be driven in a rotatable manner by a reversible electric motor drive via a gear and an electric magnetic coupling. The cable drum, gear, coupling and electric motor drive are arranged in the housing of the driving unit 5 and cannot be seen.

In FIG. 2, the linear slideway unit 4 is arranged on the side door 25 in such a manner that the slideway 6 extends approximately at right angles to the pivot axis 3 of the side door 25. The pull/push rod 11 is coupled by its second end 10 to the guide slide 9, which is guided displaceably in the slideway 6, at a distance which changes depending on the position of the side door 25, while the pull/push rod 11 is coupled by its first end 12 to the vertical edge of the opening 8 in a manner such that it can pivot about a pivot axis at a distance from the pivot axis 3.

A first cable 13 and a second cable 14 are guided in the same manner as in FIG. 1 to the driving unit 5 which is also constructed in the same manner.

In addition, a fixing element 20, which is designed as a piston-cylinder unit, is arranged parallel to the extent of the slideway 6 on the linear slideway unit 4 and the piston rod 21 of which, which protrudes out of the cylinder 22, is coupled by its free end to the upper, horizontal edge of the opening 8 in a manner such that it can pivot about the pivot axis 3. That end of the cylinder 22 which is opposite the free end of the piston rod 21 is coupled to the linear slideway unit 4.

In order to actuate the side door 25, the electric motor drive is energized and the coupling is closed, with the result that the cable drum rotates about its axis of rotation. This causes, for example, the guide slide 9 which in both exemplary embodiments is situated in an end region of the slideway 6, to be pulled by the first cable 13 to the other end region of the slideway 6, the cable drum winding up the first cable 13 and unwinding the second cable 14 to the same extent.

In this case, the side door 25 is continued to be opened via the pull/push rod 11.

If the direction of rotation of the cable drum is reversed, closing of the side door 25 takes place in the same manner.

If the energizing of the electric motor drive is ended in an intermediate position of the tailgate 2, the coupling in FIG. 1 remains closed, so that the tailgate 2 is retained in its assumed position by the electric motor drive which is of self-locking design.

In FIG. 2, if the energizing of the electric motor drive is ended, opening of the coupling also takes place. The maintaining of the assumed position of the side door 25 is then ensured by the fixing element 20.

Figure 3:
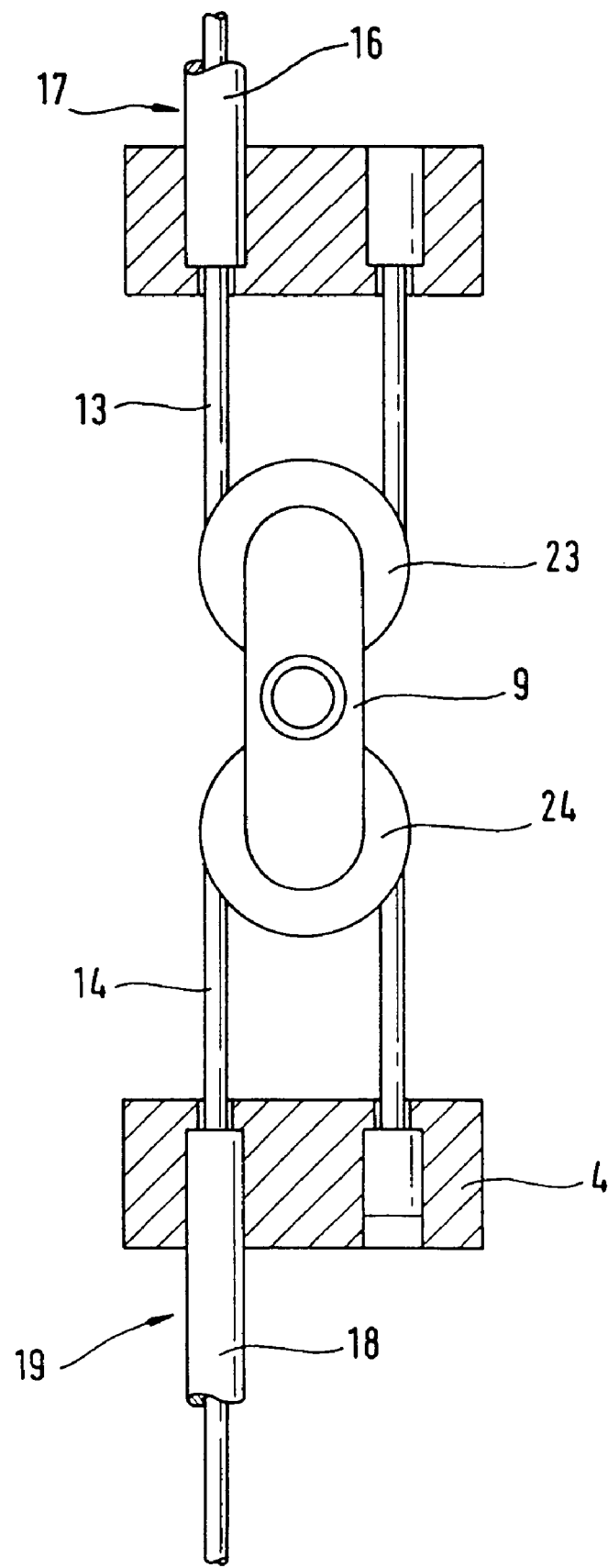
FIG. 3 shows a view of the region of a guide slide.

In FIG. 3, the end of the first and second cables 13 and 14 are fastened in each case to one end of the slideway 6 on the linear slideway unit 4. The cables 13 and 14 are guided from there to the guide slide 9 and are in each case guided about a deflection pulley 23 and 24 of the guide slide 9 and deflected through 180°. The cables 13 and 14 continue to run, as in FIGS. 1 and 2, to the driving unit 5 via Bowden cables 17 and 19.

A halving of the tensile forces which are to be applied to the cables 13 and 14 is achieved by the guiding of the cables 13 and 14 in the manner of a block and tackle.

Figure 4A:
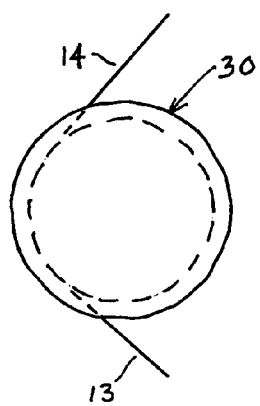
FIG. 4A is an end view of a common cable drum.
Figure 4B:
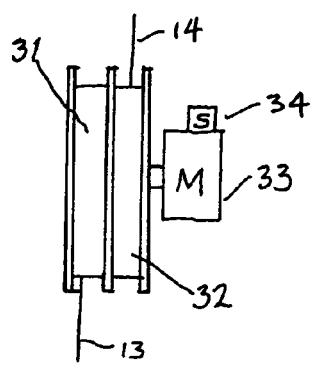
FIG. 4B is a side view of one embodiment of common cable drum.
Figure 4C:
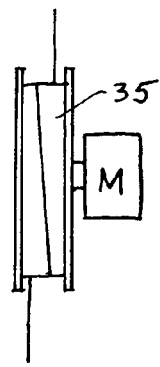
FIG. 4C is a side view of a second embodiment of common cable drum.

FIG. 4A shows a common cable drum 30, which is incorporated in the drive unit, being used for both the first cable 13 and the second cable 14. As shown in FIG. 4B, this can be accomplished with two independent winding surfaces 31 and 32 to which the cables 13 and 14 are attached, the drum being driven by motor 33, which can be provided with an angular position sensor 34. FIG. 4C shows a drum with a single winding surface 35, the cables 13 and 14 actually being opposite ends of a single cable which is wrapped around the drum, the number of wraps and the material of the winding surface being chosen so that there is no slippage.

Figure 5A:
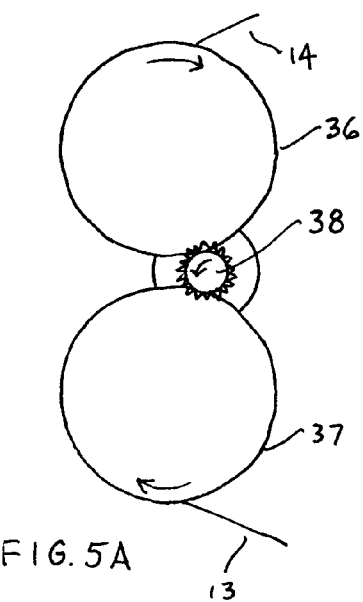
FIG. 5A is an end view of a two drum arrangement.
Figure 5B:
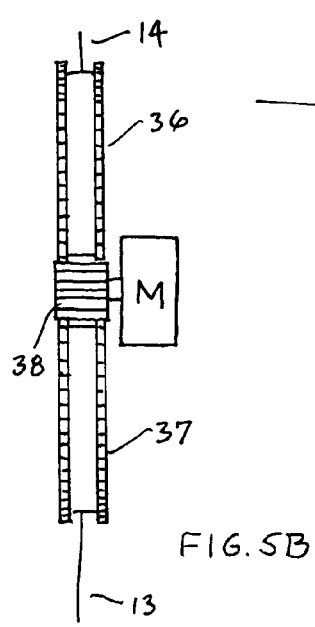
FIG. 5B is a side view of the two drum arrangement.

FIGS. 5A and 5B show an arrangement of two drums 36, 37 for the respective cables 13, 14. The drums may be driven by a single pinion gear 38 and a motor 39, which provides a mechanical advantage allowing the use of a small motor. Of course, the drum 30 of FIG. 4A may also be driven by such a pinion gear.

Figure 6:
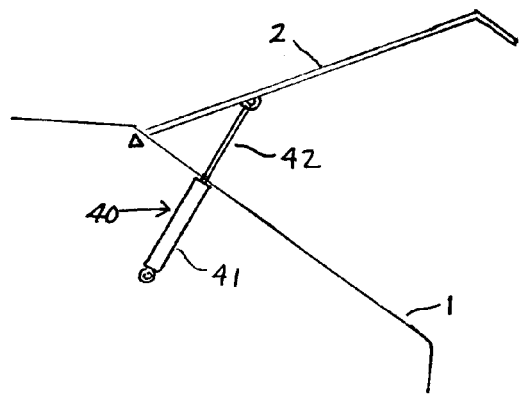
FIG. 6 is schematic side view of a force accumulator or fixing element.

FIG. 6 shows a piston-cylinder unit 40 pivotably connected to the movable part 2, in this case a tailgate of a vehicle, and the body part 1. The unit 40 is substantially parallel to the push-pull rod 11 shown in FIG. 1. While shown with the cylinder 41 attached to the body and the piston 42 attached to the vehicle, the opposite arrangement is also possible. As described earlier, this unit 40 can serve as either a force accumulator or as a fixing element.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An actuating device comprising:
   a base part;
   a movable part which can pivot about a pivot axis with respect to said base part;
   a push/pull rod having a first end which is pivotably coupled to one of said movable part and said base part at a distance from said pivot axis, and a second end which is movable along a guide path on the other of said movable part and said base part, said guide path extending transversely to said pivot axis;
   a driving device comprising a first cable which is connected to said second end of said push/pull rod for pulling said second end of said push/pull rod in a first direction on said guide path, a second cable which is connected to said second end of said push/pull rod for pulling said second end of said push/pull rod in a second direction on said guide path, and at least one cable drum for winding said cables;
   a first deflection pulley guiding at least one of said cables; and
   at least one second deflection pulley coupling at least one of said cables, respectively, to said second end of said push/pull rod.

2. The actuating device of claim 1, wherein said driving device comprises a first cable drum for said first cable and a second cable drum for said second cable, said drums being driven so that one cable is being wound while the other cable is being unwound.

3. The actuating device of claim 1, wherein said driving device comprises a common cable drum for both of said cables, and a motor which can be reversed so that one cable is being wound while the other cable is being unwound.

4. The actuating device of claim 1, wherein said driving device comprises an electric motor for driving said at least one cable drum.

5. The actuating device of claim 4, wherein said motor drives said at least one cable drum via gears.

6. The actuating device of claim 1, further comprising a sheath surrounding at least one of said cables to form a respective at least one Bowden cable.

7. The actuating device of claim 1, wherein said guide path is a rectilinear guide path.

8. The actuating device of claim 1, further comprising a slideway along said guide path and a slide which is displaceable in said slideway, said second end of said push/pull rod being pivotably connected to said slide.

9. The actuating device of claim 1, further comprising a sensor for detecting a position of said movable part relative to said base part.

10. The actuating device of claim 9, wherein said sensor is a rotational position sensor.

11. The actuating device of claim 10, wherein said rotational position sensor detects the rotational position of the movable part.

12. The actuating device of claim 10, further comprising an electric motor for driving said at least one cable drum, said sensor detecting the rotational position of said motor.

13. The actuating device of claim 9, wherein said sensor detects the position of said second end of said push/pull rod.

14. The actuating device of claim 9, wherein said sensor comprises a potentiometer.

15. The actuating device of claim 1, wherein said driving device further comprises a clutch via which said cable drum is driven.

16. The actuating device of claim 15, wherein said clutch is an electromagnetic clutch.

17. The actuating device of claim 16, wherein said electromagnetic clutch is open in a non-energized state and closed in an energized state.

18. The actuating device of claim 1, wherein said driving device comprises a self-locking electric motor.

19. The actuating element of claim 1, further comprising a force accumulator arranged between said base part and said movable part.

20. The actuating device of claim 19, wherein said force accumulator is a piston-cylinder unit having a cylinder connected to one of said base part and said movable part, and a piston connected to the other of said base part and said movable part.

21. The actuating device of claim 1, further comprising a fixing element arranged between the base part and the movable part, said fixing element retaining said movable part in a fixed position when said driving device is not actuated.

22. The actuating device of claim 21, wherein said fixing element provides a retaining force which is eliminated when said driving device is actuated.

23. The actuating device of claim 22, wherein said fixing element is a piston-cylinder unit having a cylinder connected to one of said base part and said movable part, and a piston connected to the other of said base part and said movable part.

* * * * *